Fig. 1.
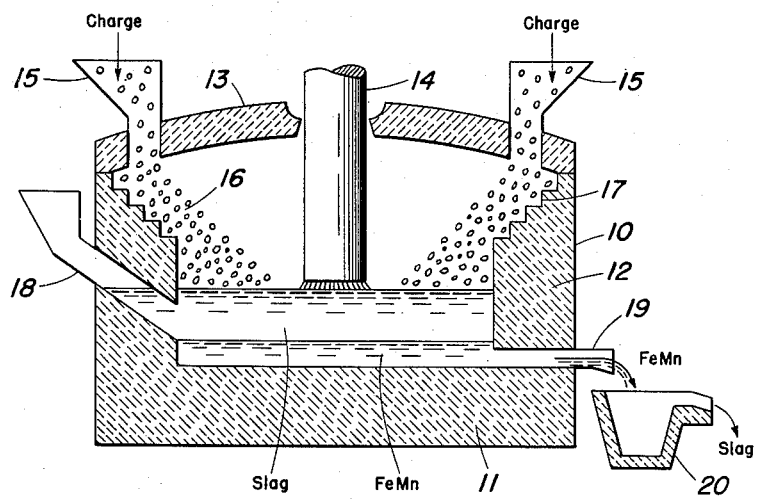
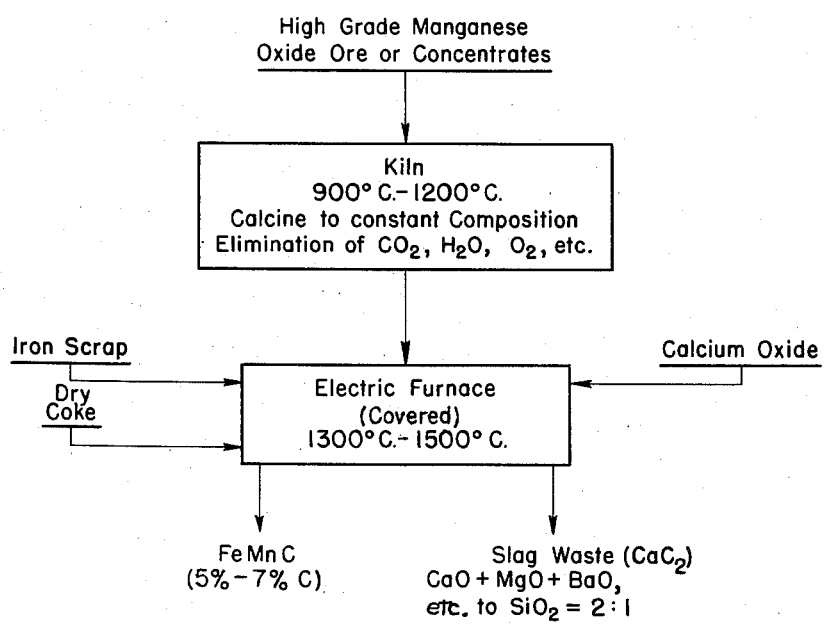
Fig. 2.
INVENTOR
Marvin J. Udy 2,830,889

PROCESS FOR THE PRODUCTION OF FERROMANGANESE FROM HIGH-GRADE MANGANESE-BEARING MATERIALS

Marvin J. Udy, Niagara Falls, N. Y., assignor to Strategic-Udy Metallurgical & Chemical Processes Limited, Hamilton, Ontario, Canada, a corporation of Ontario Application July 22, 1955, Serial No. 523,696

2 Claims. (Cl. 75—11)

The present invention relates to metallurgy and has for an object the provision of an improved metallurgical process. More particularly, the invention contemplates the provision of an improved metallurgical process for the recovery of manganese from manganese-bearing materials. The principal object of the invention is the provision of an improved single stage reduction process for the production of ferromanganese from relatively high-grade manganese-bearing materials containing manganese in oxide form.

This application is a continuation-in-part of my copending United States application, Serial No. 341,415, filed March 10, 1953, and entitled "Manganese Recovery," which was issued as U. S. Patent No. 2,775,518 on December 25, 1956.

According to some heretofore customary practices employed in the smelting of manganese oxide-bearing materials with solid carbon, substantial quantities of basic fluxing materials such as lime and dolomite are employed for fluxing acid components of the charge, such as silica. This type of practice results in the production of large quantities or volumes of high-melting point slags which, in turn, necessitate operating at relatively high temperatures in order to produce fluid or workable slags. The use of high temperatures results in high volatilization losses of manganese, and, in addition, the production of large quantities or volumes of slag contributes further to loss of manganese values by providing large volumes of solvent or vehicle for manganese compounds from which it is impossible to recover manganese on any economical basis.

Furthermore, in prior processes of the general class described, the conventional practice is to effect reduction of the manganese ore in a submerged arc type of electric furnace to which charge material is fed such as to build up and maintain a substantially deep bed or column of raw charge material surrounding the furnace electrodes. In this type of operation, it is not possible to obtain more than approximately eighty percent (80%) of the manganese values contained in the original charge material, even when treating high-grade manganese oxide ores, except possibly by resorting to multi-stage reduction techniques wherein the manganese-bearing slag product recovered from an initial reduction operation is treated in a subsequent stage or stages for further recovery of manganese or manganese-bearing products in the manner described in my aforementioned patent. Under existing operating techniques, attempts at increasing the percentage recovery in the initial reduction stage usually result in over-driving the furnace with subsequent loss of manganese through volatilization.

In accordance with a preferred process of the present invention, I am able to effect consistent recoveries in the order of ninety percent (90%) and higher in a single stage reduction operation employing natural or altered charge material of relatively low iron content and relatively high manganese (oxide) content by smelting in a covered electric furnace under accurate conditions of temperature control, a pre-treated, substantially constant composition manganese oxide-containing charge with a controlled amount of carbonaceous reducing material, and controlled amounts of fluxing material and added iron, where required, to effect reduction to the metallic state of manganese oxide of the charge with the direct production of standard grade high-carbon (5 to 7% C) ferromanganese (80% Mn), and a waste slag product.

The invention is based in part on my discovery that substantial advantages with respect to manganese recovery may be obtained by avoiding the addition of substantial amounts of basic fluxing material to a charge of manganese oxide-bearing material which is to be smelted in the presence of a solid carbonaceous reducing agent such as coal or coke. In accordance with one feature of my invention, a high-grade manganese oxide-bearing ore, concentrate, or the like, in which the manganese is present in the form of one or more higher oxides than manganese oxide (MnO), as, for example, in the form of manganese dioxide or pyrolusite ($MnO_2$) or hausmannite ($Mn_3O_4$), or both, is heated in a rotary kiln or other suitable equipment, to remove all water, the labile oxygen from $MnO_2$, $CO_2$, S, etc., thereby to stabilize the ore or concentrate to a constant composition with respect to oxygen content in order to provide better control of reduction by carbon of the coke, coal, etc. Unlike the two stage process of my copending application, in accordance with a process of the present invention, I add to the furnace charge calcium oxide (CaO) or similar basic fluxing material, such as magnesium oxide (MgO), to provide with silica present in the charge, slag having a base-acid ratio of 2 base to 1 acid. The heated and stabilized product or charge is then fed without substantial dissipation of heat, with dry carbon in the form of coke, coal, wood or charcoal, into a covered electric furnace and smelted according to the principles disclosed in my aforementioned patent, as described more fully hereinafter.

In the submerged arc type of smelting technique heretofore employed in industry, the positioning of charge material surrounding the furnace electrodes in the manner described hereinbefore, causes an undesirable concentration of coke adjacent the electrodes which makes it virtually impossible to control operating temperatures within the furnace to any accurate degree, and very often results in over-reduction of the charge with increased volatilization losses. In accordance with a further feature of the present invention, I avoid this phenomenon completely and am able to attain a very accurate temperature control through careful positioning of the furnace electrodes in a manner similar to that described in my aforementioned copending application. Specifically, in a single stage reduction operation for the production of ferromanganese from high-grade manganese oxide-bearing materials, I prefer to employ a covered electric furnace provided with one or more vertically extending electrodes mounted in conventional form. In operating such a furnace according to a process of the present invention, I avoid wetting of the electrodes with molten slag and thereby avoid full slag resistance heating by maintaining their arcing tips a distance ranging from about one-half inch (½") above the surface of molten slag in the furnace to about three inches (3") below the surface of the molten slag. By operating the furnace in this manner, the heat generated in the slag by the $I^2R$ effects due to the resistance of the slag will reach a substantially constant temperature equivalent to the melting point of the slag and no higher while there is unmelted charge within the furnace. On the other hand, the heat generated in the short arcs (½" above the slag to 3" within slag) and due to the $I^2R$ effects of the arcs, per se, is of a higher order of temperature, and thus, by controlling the applied voltage to the slag bath as well as the rate of feed of charge material (lbs. per kw.-hr.) to the furnace, I am able to regulate and control the combined slag resistance and arc resistance heating to temperatures within 100° C. of the melting point of the alloy produced. Furthermore, I avoid penetration of the electrodes within a descending column of raw charge by introducing charge material into the interior of the arc resistance-slag resistance furnace and onto the surface of a molten slag bath maintained therein at a rate such that it is deposited on the surface of the molten slag bath between the furnace walls and the electrodes, or at a rate and direction of flow such that it does not flow into contact with the electrodes and builds up on the surface of the slag to a maximum depth of only a few inches, if at all. I have found that under such conditions of operation vaporization of manganese is substantially completely avoided.

In carrying out a process of the invention, a further important feature thereof resides in the preliminary treatment of manganese oxide ore for purposes of providing a reduction charge of substantially constant composition. Thus, I have found that it is essential for proper carbon determination and subsequent reduction in the smelting stage, that the manganese-bearing material be stabilized to a substantially constant composition by removal of water, carbon dioxide, oxygen of manganese dioxide, etc. For this purpose, I calcine raw manganese oxide-bearing ore prior to the single stage reduction by heating the ore in a rotary kiln or similar piece of equipment at a temperature within the range 900° C. to 1200° C.

The aforementioned and other features and objects of the invention may be best understood by reference to the following description of specific embodiments thereof taken in conjunction with the accompanying drawing wherein:

Fig. 1 is a sectional elevational view of a covered electric furnace illustrating the single stage reduction technique employed in effecting a process of my invention; and Fig. 2 is a flow diagram illustrating the exact sequence of steps involved in a preferred process of the present invention.

In carrying out a process of the invention for smelting a charge comprising manganese oxide-bearing ore or concentrates, the smelting charge employed may consist essentially of the manganese oxide-bearing material, added basic fluxing material, as required, solid carbonaceous reducing material, such as coal or coke, and added iron, preferably in the form of scrap iron in an amount sufficient to provide for the production of standard grade (80%) ferromanganese. The components of the charge are so proportioned as to provide carbonaceous reducing agent in amount sufficient to reduce to the metallic state iron of iron oxide that may be present in the charge, and to reduce to elemental manganese the higher oxides of manganese present in the charge. Thus, in calculating a charge for the single stage smelting of a high grade ore or concentrate which has been stabilized by calcining the raw ore or concentrate in the manner explained above, I calculate all basic constituents other than manganese oxide, such as calcium oxide, magnesium oxide, barium oxide, etc., to the equivalency of calcium oxide, and adjust the equivalent calcium oxide to the silica in the ore or concentrate to provide a slag of 2 base to 1 acid (or anywhere within the range 1.7 to 2.2 base to 1 acid), i. e., $MgO+BaO+CaO$, etc. to $SiO_2$ should be in the ratio of about 2:1; calcium oxide or an equivalent added basic fluxing agent being added only as required to adjust the base-acid ratio to the desired range. Alumina ($Al_2O_3$) when present in the ore or concentrates in amounts less than ten to twelve percent (10–12%) may be disregarded in the calculations. Larger amounts of alumina are calculated to $SiO_2$ equivalency. It is of the utmost importance for efficient reduction in the smelting stage, that the carbon determination be made on the basis of a substantially constant composition charge, and, accordingly, that feature of my invention involving stabilization of the charge material by calcining, contributes substantially to the overall efficiency of the process. It is essential that the coal, coke, etc., used for reduction be dry, and, that carbon be provided in an amount sufficient for reduction of manganese and iron oxides, chemical combination with iron and manganese for the production of high-carbon ferromanganese, and to form in the basic slag (2CaO to $1SiO_2$) a small amount of calcium carbide ($CaC_2$). It is the formation and presence in the slag of but a trace of calcium carbide which permits the production of slags very low in manganese, in that, a slight amount of calcium carbide in the slag upsets the equilibrium of the manganese oxide and slag and permits almost complete reduction of manganese. In this manner, slags containing one percent (1%) or less of manganese can be produced readily as compared with ten percent (10%) to twenty percent (20%) present in slags formed in accordance with conventional smelting techniques. Alternatively, instead of forming the calcium carbide in the slag from the lime and coke additions, I may add calcium carbide to the charge directly in varying quantities either in the form of a high-grade product (4.75 cu. ft. $C_2H_2$ per pound) or a low grade product (2.5 to 3.5 cu. ft. $C_2H_2$ per pound). The calcium carbide may be used in whole or in part with coke or in place of coke as the reducing agent. It functions to supply lime for the silica and acts as a reducing agent for manganese and iron when used in larger amounts than the trace necessary for producing very low manganese slags. I may also employ a noncarbonaceous reducing agent such as ferrosilicon, silicon carbide or aluminum to reduce last traces of manganese from manganese slags to produce waste slags very low in manganese in lieu of calcium carbide in the manner explained above, provided lime is added, as required, to maintain the desired ratio of 2.0 base to 1.0 acid within the slag.

In smelting a charge in accordance with the single stage reduction technique of my invention, I employ a covered electric arc furnace provided with one or more vertically extending electrodes, and I operate the furnace at a voltage so as to maintain the arcing tips of the one or more electrodes in position with respect to molten slag contained in the furnace within about one-half inch (½") above the surface of the molten slag bath to about three inches (3") below the surface of the slag bath, thereby avoiding wetting or immersion of the electrodes by the slag. Furthermore, I introduce charge material into the furnace and onto the surface of the molten slag bath therein in such manner as to avoid any substantial build-up of charge material around the electrodes. By operating the furnace in this manner, I am able to maintain a very accurate temperature control within the furnace, which, for the temperature of the slags utilized in accordance with the invention, may be within the range 1300° C. to 1500° C., thereby substantially avoiding vaporization of manganese as characteristically occurs in conventional submerged types of smelting operations by reason of the high temperatures produced by accumulation of coke, etc. Furthermore, by regulating the electrodes in this manner, I am able to insure delivery to the molten slag bath of substantially all of the arc-developed heat and can inhibit any substantial dissipation of heat due to reflection. I also effectively avoid the establishment of high pressure zones around the electrodes caused by carbon dioxide gases generated during the reduction process becoming entrapped by deep beds of raw charge material, as occurs in conventional submerged arc operations, and the attendant danger to operators resulting from periodic so-called "blowing" under action of gases entrapped in this manner.

The exact method of operating a furnace in accordance with my invention may be best understood by reference to Fig. 1 of the drawing wherein I have shown an arc electric furnace 10 which may be of any suitable configuration in horizontal cross-section. The furnace 10 comprises a hearth or bottom portion 11, side walls 12, and a roof 13 all formed of appropriate refractory materials (preferably carbon-lined).

The furnace roof 13 is provided with suitable openings through which electrodes 14 (one shown) extend and which permit vertical movement of the electrodes in accordance with operational demands and characteristics. The space between the electrodes and the edge of the openings through which they extend or project may be provided with any suitable packing or sealing means to inhibit or restrict the flow of gases between the interior and the exterior of the furnace without interfering with the necessary vertical movement of the electrodes.

Hoppers 15 having their lower portions extending through and sealed in openings in the roof 13 are provided adjacent the outer side edges of the arc electric furnace 10 in alinement with the electrodes to permit introduction of charge materials 16 into the interior of the furnace. Those portions of the side walls of the furnace immediately beneath hoppers 15, as indicated by reference numeral 17 in Fig. 1, preferably are so designed as to provide a slope corresponding to or equivalent to the angle of repose of the charge material. Preferably, the sloped portions of the walls are stepped, as shown in Fig. 1, to provide for the deposition and retention thereon of protective coatings of charge material. A conduit (not shown) may be provided for communicating with the interior of the furnace 10 through an opening in the roof to permit the collection and utilization of carbon monoxide produced during the course of the process. A charging spout or runner or launder 18 is provided to permit the introduction of molten charge material into the interior of the furnace 10 when the furnace is employed in multi-stage operations such as those described in my aforementioned patent, and which may be employed in accordance with a process of the present invention, if desired, for introducing hot calcined ore or concentrates into the furnace. Alternatively, the ore or concentrates after calcining to a constant composition may be introduced into the interior of the furnace 10 as a component of the charge material supplied through hoppers 15 including carbonaceous reducing material, and added basic fluxing material and iron, as required. The furnace 10 is further provided with a conventional taphole 19 through which molten ferromanganese and molten slag may be delivered from the interior of the furnace to a suitable ladle 20 at appropriate times.

In order to initiate operation of the furnace I may deliberately add extra slag of approximately a 2:1 ratio of CaO to $SiO_2$ to establish a shallow layer of molten slag within the furnace. After the slag has accumulated, it is removed as required, but I always leave sufficient slag in the furnace so that the electrode tips can be carried on the slag to the depth desired, as specified hereinbefore. I have found that operation with the electrodes carried to a depth of one-half inch (½") above the surface of molten slag to a maximum of three inches (3") within the shallow layer of molten slag produces optimum results under actual operating conditions. Operation of the furnace in this manner permits the conjoint use of arc resistance and slag resistance heating within the smelting furnace and the total overall power requirements or power consumption is of the order of about twenty-four hundred kilowatt hours (2400 kw.-hr.) per ton of standard grade ferromanganese produced which represents a saving of about thirty percent (30%) of the power usually required for carrying out electric furnace processes of the type employed heretofore. Through operation of the furnace constantly as an arc resistance-slag resistance furnace with short arcs, and, by reason of the substantially constant resistance slag bath obtained through control of the depth of slag, I am able to operate at higher voltages and a constant power factor of 95% as compared with power factors of 75% to 85% at which large arc electric furnaces are operated in accordance with heretofore customary practices.

In the operation of the electric furnace according to my invention, automatic electrode regulators are set to maintain the electrodes in constant or substantially fixed positions relative to the surface of the molten slag bath, because, for a particular type of operation, the slag is of substantially constant resistance. When an increase or decrease in the temperature of the molten slag is desired for a particular operation, the voltage and power input is simply increased or decreased and the electrode regulator is adjusted to maintain the arc lengths within the desired range specified hereinbefore. In following this procedure the resistance is maintained constant and, consequently, the power input is increased or decreased.

It should be apparent that by increasing or decreasing the arc gaps within the limits specified hereinbefore, I am able to control both arc resistance heat supplied to the charge and slag resistance heat developed within the charge, and the conjoint use of heat supplied from both sources enables me to effect a very accurate temperature control of the overall slag bath. Furthermore, the temperature control effected in this manner is not subject to frequent unbalance because of local intense temperature zones caused by coke accumulations, etc., since I avoid the buildup of charge material around the electrodes and thereby effectively avoid conditions which lead to the establishment of such zones of uncontrollable heat. While I prefer to employ a covered furnace in the process of my invention, a furnace without a cover may be used although not without some sacrifice in efficiency.

When the ore or concentrate is deficient in iron, iron in metallic form or in the form of iron oxide may be incorporated in a charge comprising the ore or concentrate in an amount sufficient to provide for the production of standard grade ferromanganese. In actual practice, I prefer to use iron in the form of scrap iron or steel for this purpose.

The following is an analysis of typical ore used in the production of ferromanganese in accordance with a process of the invention.

*Manganese oxide ore (high grade)*

| | Percent |
|---|---|
| Manganese (Mn) | 48.00 |
| Calculated to $MnO_2$ | 76.00 |
| Calculated to $Mn_3O_4$ | 66.50 |
| Ferric oxide ($Fe_2O_3$) | 1.20 |
| Alumina ($Al_2O_3$) | 1.20 |
| Barium oxide (BaO) | 2.20 |
| Calcium oxide (CaO) | 5.40 |
| Magnesium oxide (MgO) | 1.09 |
| Silica ($SiO_2$) | 6.50 |
| Phosphorus (P) | 0.03 |

The following example illustrates the specific application of the foregoing principles and objects to the production of ferromanganese in a single stage reduction operation of the invention as illustrated in the flow diagram of Fig. 2:

EXAMPLE

A charge consisting essentially of 1000 pounds of high-grade manganese ore of approximately the composition indicated above, 296.7 pounds of coke (80% fixed carbon), 44.0 pounds of calcium oxide, and 10.0 pounds of iron is fed to a rotary kiln or other sintering device and heated with oil, gas or coal to a temperature of 1100° C. I may add the reducing agent (coke) to the charge to the kiln or to the electric furnace and may also employ lime in the form of limestone within the kiln charge. The hot charge from the kiln may be cooled and used in a cold state if desired and economics warrant such practice.

In practice, coke may be added to plus or minus ten percent (±10%) and is varied from time to time and adjusted for carbon entering the bath by reason of electrode consumption. With the ore stabilized to $Mn_3O_4$, or $MnSiO_2$, or combined with lime and silica, the proper variation of coke is easily established. Excess coke is provided to form a small amount of calcium carbide unless the calcium carbide is added directly to the charge as explained hereinbefore.

The hot product discharged from the kiln is fed directly to the electric furnace of the type illustrated in Fig. 1, and smelted at a temperature within the range 1300° C. to 1500° C. to reduce the iron and manganese oxides with the production of feromanganese of 80% manganese, 7% carbon, and a waste slag product containing calcium carbide and manganese in the order of a trace to one percent (1.0%). Volatilization losses are of the order of one to two percent (1-2%) of the manganese, and recoveries of manganese in the form of ferromanganese are of the order of ninety-five to ninety-seven percent (95-97%).

In alternative processes of the invention, non-carbonaceous reducing agents such, for example, as silicon, aluminum and magnesium as such or in the form of low-carbon alloys may be employed as reducing agents in the treatment of ore or concentrates to provide for or permit the production of low-carbon and medium-carbon grades of ferromanganese, as distinguished from high-carbon products formed or produced when carbonaceous reducing agents are employed.

Since it is considered obvious that many changes and modifications can be made in the foregoing methods and procedures without departing from the nature and spirit of my invention, it is to be understood that the invention is not to be limited to the specific details offered by way of illustration above, except as set forth in the following claims.

I claim:

1. A single stage smelting process for producing ferromanganese from relatively high-grade manganese-bearing material comprising oxides of manganese, iron, calcium and silica, that comprises calcining the manganese-bearing material at a temperature controlled within the range 900-1200° C. to stabilize the same by elimination of water and labile oxygen with the production of a substantially constant composition reduction burden; passing the hot stabilized charge thus produced directly into a covered open-arc electric furnace and onto the surface of a molten slag bath maintained therein in the presence of (1) reducing material in an amount sufficient to effect reduction of the iron and manganese oxides of the material to the metallic state, (2) added calcium oxide in an amount sufficient to provide for the production of residual slag comprising silica and basic oxides in proportions equal to about two molecules of basic oxide to each molecule of silica, and (3) iron in an amount as required to combine with manganese and iron naturally present in the material to produce a desired grade of ferromanganese; smelting the charge at a temperature controlled within the range 1300-1500° C. to effect reduction to the metallic state of the iron and substantially all of the manganese oxide of the material by means of said reducing material with the production of a molten ferromanganese product and molten residual slag low in iron and manganese; and separating and recovering the ferromanganese from the residual slag; said smelting temperature being controlled within the range 1300-1500° C. during the course of the process and vaporization of manganese being minimized by (1) maintaining the arcing tips of the furnace electrodes between about one-half inch (½") from the upper surface of the molten slag bath therein and about three inches (3") below the upper surface of said molten slag bath, (2) maintaining a substantially constant resistance slag bath within the furnace by controlling the depth of molten slag, and (3) introducing charge material into the furnace and onto the surface of the molten slag bath therein at a rate and in a direction controlled to avoid substantial submergence of the arcing tips of the electrodes within raw charge material.

2. A single stage smelting process for producing ferromanganese from relatively high-grade manganese-bearing material comprising oxides of manganese, iron, calcium and silica, that comprises calcining the manganese-bearing material at a temperature controlled within the range 900-1200° C. to stabilize the same by elimination of water and labile oxygen with the production of a substantially constant composition reduction burden; passing the hot stabilized charge thus produced directly into a covered open-arc electric furnace and onto the surface of a molten slag bath maintained therein in the presence of (1) solid carbonaceous reducing material in an amount sufficient to effect reduction of the iron and manganese oxides of the material to the metallic state, to provide for chemical combination with metallic iron and manganese in the production of a high-carbon ferromanganese product, and to form with calcium oxide at least a trace amount of calcium carbide within the residual slag; (2) added calcium oxide in an amount sufficient to provide for the production of residual slag comprising silica and basic oxides in proportions equal to about two molecules of basic oxide to each molecule of silica, and (3) iron in an amount as required to combine with manganese and iron naturally present in the material to produce a desired grade of ferromanganese; smelting the charge at a temperature controlled within the range 1300-1500° C. to effect reduction to the metallic state of the iron and substantially all of the manganese oxide of the material by means of said solid carbonaceous reducing material with the production of a molten high-carbon ferromanganese product and molten residual slag low in iron and manganese and comprising silica, basic oxides and at least a trace amount of calcium carbide; and separating and recovering the ferromanganese from the residual slag; said smelting temperature being controlled within the range 1300-1500° C. during the course of the process and vaporization of manganese being minimized by (1) maintaining the arcing tips of the furnace electrodes between about one-half inch (½") from the upper surface of the molten slag bath therein and about three inches (3") below the upper surface of said molten slag bath, (2) maintaining a substantially constant resistance slag bath within the furnace by controlling the depth of molten slag, and (3) introducing charge material into the furnace and onto the surface of the molten slag bath therein at a rate and in a direction controlled to avoid substantial submergence of the arcing tips of the electrodes within raw charge material.

References Cited in the file of this patent

UNITED STATES PATENTS

| | | |
|---|---|---|
| 1,484,670 | Petinot | Feb. 26, 1924 |
| 1,751,083 | Gustafsson | Mar. 18, 1930 |
| 1,857,779 | Flodin et al. | May 10, 1932 |
| 2,310,258 | Riveroll | Feb. 9, 1943 |
| 2,523,092 | Bryk et al. | Sept. 19, 1950 |
| 2,549,994 | Udy | Apr. 24, 1951 |
| 2,598,744 | Handwerk et al. | June 3, 1952 |
| 2,598,745 | Handwerk et al. | June 3, 1952 |

FOREIGN PATENTS

| | | |
|---|---|---|
| 8,400 | Great Britain | 1912 |